United States Patent [19]
Herzlich et al.

[11] 3,888,291
[45] June 10, 1975

[54] MOLDED OR CAST TIRES AND METHODS OF MANUFACTURE

[75] Inventors: Harold J. Herzlich, Wellingord; Paul F. Fitzgerald, West Haven, both of Conn.

[73] Assignee: The Armstrong Rubber Company, New Haven, Conn.

[22] Filed: Dec. 12, 1973

[21] Appl. No.: 424,097

[52] U.S. Cl.......... 152/330 R; 152/354; 152/357 A; 156/110 CL; 156/128 T; 156/331; 161/190; 161/231
[51] Int. Cl............................. B60c 5/00; B60c 9/00
[58] Field of Search........ 152/209 R, 330 R, 357 A, 152/354, 355; 301/63 PW; 260/45.85 R, 75; 161/231 R, 190; 156/110 CL, 128 T, 331

[56] References Cited
UNITED STATES PATENTS

| | | | |
|---|---|---|---|
| 3,208,500 | 9/1965 | Knipp et al. | 152/357 A |
| 3,458,373 | 7/1969 | Knipp et al. | 152/357 A |
| 3,470,933 | 10/1969 | Molnar | 152/357 A |
| 3,651,014 | 3/1972 | Witsiepe | 260/45.85 R |
| 3,701,374 | 10/1972 | McGillvary | 152/330 R |

*Primary Examiner*—Drayton E. Hoffman
*Attorney, Agent, or Firm*—Steward & Steward

[57] ABSTRACT

A pneumatic tire having a tire casing consisting entirely of a molded copolyester elastomer with a rubber tread bonded integrally to the casing, and a method of manufacturing the same.

11 Claims, 4 Drawing Figures

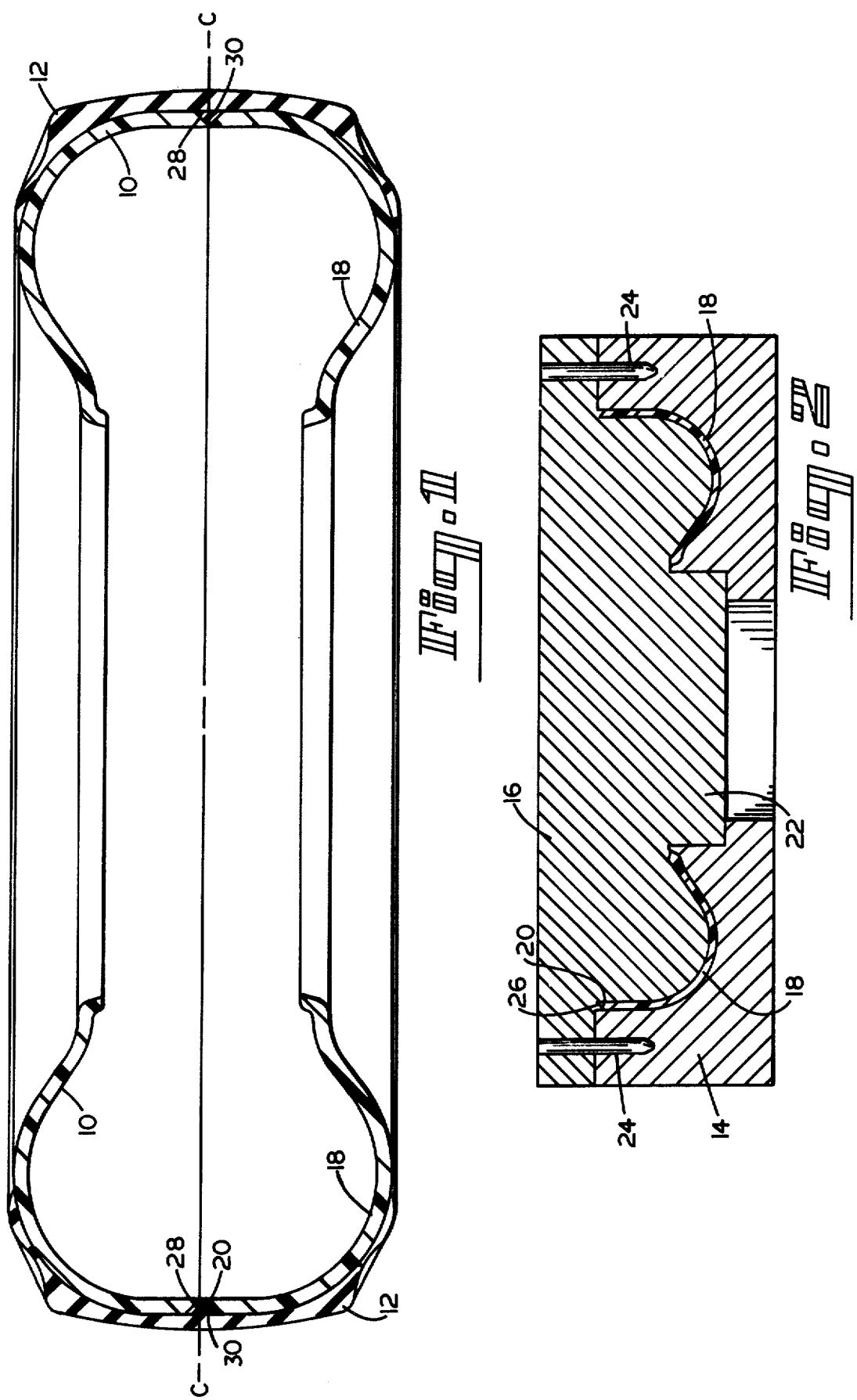

MOLDED OR CAST TIRES AND METHODS OF MANUFACTURE

BACKGROUND OF THE INVENTION

The present invention relates to the manufacture of pneumatic tires for vehicles, and it relates more particularly to castable cordless tires.

With few exceptions, pneumatic tires for automobiles, trucks, aircraft and the like are constructed on a rotating building drum by applying a plurality of strips of rubber or rubberized materials, one on top of the other, during the course of which a rigid ring or bead is applied to each edge of the tire so that when the tire is blown up on a rim the beads fit snugly on the rim at all times. In order to obtain the strength required, the underlayers of the tire include one or more plies of cord or stranded material, commonly referred to as the fabric or carcass plies of the tire. The outer layers of the tire include the tread and sidewall stock, and also in the case of so-called radial and "belted" tires, one or more layers of other rubber-impregnated cord materials such as fiber glass, steel wire and the like are employed.

It has long been considered highly desirable to develop a method of casting tires from a material having the physical properties required for highway vehicle tires, but to date no tires of this kind are being produced commercially. An object of the present invention, therefore, is to produce cast cordless tires, which can be manufactured on a large scale at considerably reduced cost in labor and machinery relative to conventional rubber-cord ply tires, while at the same time to improve upon, or at least maintain, the quality of conventional tires in every respect.

It is known that copolyester polymers supplied by E. I. DuPont de Nemours and Company under the tradename "Hytrel" possess most of the necessary properties for a casing material for vehicle tires. Hytrel is a segmented, thermoplastic, copolyester elastomer, containing recurring polymeric longchain ester units derived from dicarboxylic acids and low molecular weight diols, as disclosed for example in U.S. Pat. No. 3,651,014. This material has an extremely high modulus, as well as high tensile and impact resistance, as compared to rubber, and being thermoplastic can be cast into the shape of a tire casing by various means, including injection and rotational molding. In addition, it has a wide temperature range, over which it exhibits excellent physical properties, and it has good cut-growth properties as well. On the other hand, it has been found that the Hytrel polymers do not have the desired traction properties of tread rubber. For this reason highway tires can not be made entirely out of Hytrel. Consequently, in order to take advantage of the remarkable strength of this material for tire manufacturing purposes, it has been necessary to develop a satisfactory method of bonding or otherwise adhering conventional rubber tread-stock to a tire casing made of Hytrel.

The term "tire casing" as employed herein refers to a substantially complete tire except that the tread portion is omitted. It may be likened, for example, to a used tire, the tread of which has been worn almost to the carcass plies in a conventional reinforced rubber tire.

SUMMARY OF THE INVENTION

The invention resides generally in a pneumatic tire having a tire casing of molded thermoplastic copolyester elastomer containing long-chain ester units and in the method of manufacturing the same by (1) casting a tire casing from the copolyester elastomer, (2) applying a bonding agent containing a non-volatile isocyanate, (3) cementing an uncured rubber tread stock of conventional tread-stock formulations to the cast casing and (4) curing the tread in a mold while thus cemented to the cast casing at substantially conventional temperature and pressure in order to integrally bond the tread to the copolyester elastomer. The tire casing of the present invention therefore consists essentially of a particular thermoplastic polymer which serves as the support system of the tire for the vehicle on which it is used and does not require reinforcing beads and fabric or the time consuming and laborious process necessary in building tires out of such materials. As used hereinafter, the term "curing" of the rubber tread is synonymous with vulcanizing, wherein application of heat is required in order to cause an irreversible chemical reaction.

PREFERRED EMBODIMENTS OF THE INVENTION

These and other objects and advantages of the invention will become more apparent from the description of certain embodiments of the invention, reference being had to the accompanying drawings, wherein FIG. 1 is a cross-sectional view of a tire constructed in accordance with the invention;

FIG. 2 is a cross-sectional view of a compression mold for forming one-half of the tire-casing portion of the tire shown in FIG. 1, the mold being illustrated on a smaller scale than the tire in FIG. 1;

Figure 3:
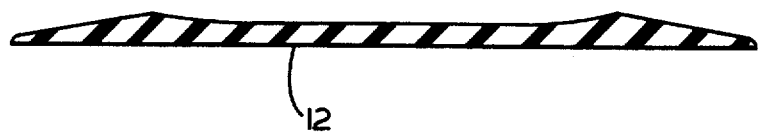
FIG. 3 is a cross-sectional view of an uncured rubber tread-slab employed for a passenger type tire embodying the invention.

It has been found that DuPont's Hytrel polymers, such as Hytrel 5525 and 5555, which are in the medium-durometer range of hardness (55 Shore D), and Hytrel 6355, which is a high-durometer (63 Shore D) material, provide good results for tire manufacturing purposes, whereas the low-durometer polymers, such as Hytrel 4055 (92 Shore A), are not suitable, because the material has high plastic creep and insufficient modulus. As further identification of the medium to high durometer elastomers employed in the molded casings for tires of the present invention, the following physical properties were published in a technical paper entitled "New High Performance Thermoplastic Elastomers" presented in October 1971 by Brown and Witsiepe at the one-hundredth meeting of the Rubber Division of the American Chemical Society:

| Room Temperature Properties | Medium Durometer 55 Shore D | High Durometer 63 Shore D |
| --- | --- | --- |
| Tensile strength, psi | 6000 | 6500 |
| Elongation at break, % | 680 | 560 |
| 100% Modulus, psi | 2100 | 2700 |
| Tear Strength, ASTM D-624, Die C | 850 | 750 |
| NBS Abrasion | 3500 | 1500 |

The melting point of these thermoplastic polymers is around 400°F.

Where compression molding is employed in accordance with the invention, it is necessary to mold the torroidal shape of the tire in two sections, each section forming approximately one-half the tire split along the centerline C—C (FIG. 1). A suitable amount of the selected copolyester polymer, preferably in powder form, is selected in order to completely fill the cavity of the mold with a minimum of flashing when the material is softened under heat.

FIG. 1 shows a tire that has a casing 10 consisting entirely of a thermoplastic polymer, which has been cast or molded into the general shape of a conventional passenger tire casing. An uncured tread 12 is cemented to the tread and buttress portions of casing 10 and then cured in place. The tire casing 10 may be formed in the single compression mold shown in FIG. 2, in which a female bottom half 14 receives a male top half 16 to form a cavity that is the shape of a half-casing 18. Each half-casing 18 has a circular edge 20, along which it is joined to another, but oppositely facing, half-casing 18.

A cylindrical portion 22 in the center of the top half 16 of the mold fits snugly within a corresponding central opening in the bottom half 14 of the mold for guiding the two halves into place. Guide pins 24 at the periphery of mold halves 14 and 16 extend perpendicular to their mating surface and fit freely through suitable guide holes in the mold parts for maintaining alignment between them.

The powdered polymer is placed in the bottom half 14 of the mold, which is then closed by placing the top half 16 loosely in position on guide pins 24 and with its cylindrical portion 22 disposed within the central opening in the bottom half 14. In order to ensure complete softening of the powdered copolyester polymer before pressure is applied to the mold, a potentiometer wire is inserted through a suitable opening in the mold into direct contact with the polymer, and the mold transferred to an oven that has been preheated to 510°F where the material is allowed to reach a temperature of 425°F (as determined by the thermocouple).

The mold is then removed from the oven and allowed to cool for a few minutes before it is placed in a press. For small tires of the so-called "Go Cart" type, which have been made experimentally, the mold was cooled for 5 minutes, and then a partial pressure was applied to it for another 5 minutes, in order to allow the polymer to distribute uniformly throughout the mold cavity. The full pressure of the press, which in this instance was 1300 psi, was then applied for 20 minutes. When the mold is removed from the press, it is allowed to cool for another twenty minutes before being opened. Since only half the tire casing is formed in the mold, the formed section is readily removable from the mold by simply lifting the top half 16 and prying the molded part from that portion of the mold to which it may adhere.

As will be noted in FIG. 2, the top half 16 of the mold is provided with a lip 26 which forms a 45° bevel on the edge 20 of each half-casing 18, so that a V-groove is formed at 28 in the outer surface of the complete casing 10 along the juncture of the two halves. If desired, however, the edge 20 of each half-casing 18 may be beveled by placing it in a suitable lathe after it has hardened and then removed from the mold. Furthermore, in order to assist in the mechanical adhesion of the tread rubber 12 to the casing, the outer surface of the casing should be roughened in the tread and shoulder areas. This can be readily accomplished by using coarse sandpaper while the half-casing is still in the lathe if the edge 20 is beveled by machine or by placing the full casing 10 in a lathe after the two halves have been joined in which case the entire area to which the tread is to be applied is sanded at one time.

In order to form the full casing 10 from the compression-cast, half-casings, two half-casings 18, are placed on a holder similar to a tire rim with their outer edges 20 in contact with each other, so that the circumferential V-groove 28 is formed between them. Rods, or continuous lengths of the same copolyester material, from which the casing sections are molded, are employed to weld the two sections together by heating the rod and a portion of the juncture with a hot air welding gun while the end of the rod is held in contact with the V-groove 28. As the rod softens it flows into the groove, integrally uniting the heated edge portions of the halves. Care must be taken in this operation to precisely mate the welding rod with the indenture. It is desirable to apply three layers of welding material in order to complete the junction of the two half-sections, each layer being applied completely around the periphery of the tire casing before the next is applied, thereby resulting in a continuous application of welding material three times around the casing. The outer surface of the weld area 30 is then smoothed using a fine grinding wheel and then sanded.

The completed casing 10 is prepared for application of a standard tread rubber composition by coating the surface of the casing in the tread and shoulder areas where the rubber tread slab is to be applied with a material containing an isocyanate which promotes the chemical bond between the uncured rubber and the polymer of the casing when the tread is cured. Two thin coats of such adhesive or bonding material in liquid form are applied by means of a brush or other suitable applicator, the first coat being allowed to dry before the second coat is applied. It has been found that a highly satisfactory bond can be obtained between the copolyester polymer of the tire casing and the tread rubber by using a material comprising a solution and dispersion of organic compounds, fillers and non-volatile isocyanate in organic solvents. Such an adhesive material is available under the tradename Chemlok 402 from Hughson Chemicals, Lord Corporation of Erie, Pa. This material dries sufficiently in about 15 minutes after it is applied to permit the second application. A similar time is all that is required for the second or subsequent coats to dry. Chemlok 402 has the advantage of changing from a gloss to a dull black appearance, thereby signalling when it is dry enough to proceed. Another advantage of this particular adhesive is that the quality of the bond it produces between the Hytrel copolyester and rubber does not seem to diminish with time. Consequently, it is possible to prepare the tire casings 10 and to store then indefinitely before the tread rubber 12 is applied. For this reason Chemlok 402 is easier to handle than other isocyanate adhesives, such as DuPont's Hylene M50, which is methylene bis(4 phenyl isocyanate) in monochlorobenzene. However, in order to obtain good adhesion with Hylene M50, it has been found necessary to allow it to dry for not substantially more or less than 2 hours after it is applied. Hylene M50 is therefore less desirable than Chemlok 402 from the handling and storage standpoint. Nevertheless, Hylene M50 can be employed with good success in bonding rubber to the Hytrel polymers hereinbefore identified.

After the isocyanate adhesive has been applied to the surface of the cast casing where the tread rubber is to be placed and allowed to dry for the required length of time, rubber cement is applied over the isocyanate-containing adhesive in order to make the surface of the casing tacky so that the tread slab clings to it and remains in place when applied thereto. While the rubber cement is allowed to dry, a slab of tread material, extruded in the usual manner and having the desired length and cross sectional shape, is cleaned with a suitable solvent, such as gasoline, then wire brushed and coated with cement in order to improve the tack.

When the cement has dried to the desired tack, the tread slab is positioned on the copolyester casing in a manner similar to that employed in applying tread material to a tire casing in a conventional retreading process. In order to make sure that all the trapped air is expelled from between the layer of tread stock and the tire casing, the tread must be thoroughly stitched to the casing using conventional tire stitchers. Furthermore, removal of any trapped air may be assisted by awling the entire tread and shoulders before stitching. This may be done either by hand or by machine, using a tool which will form holes approximately one-sixteenth inch in diameter about one inch apart and to a depth not substantially greater than the thickness of the tread.

As shown in FIG. 3 the cross-sectional shape of the tread slab is more or less conventional, except that it may be somewhat narrower than one for building the usual fabric-ply tire, due to the fact that the present tire only requires rubber at the center tread, shoulder and buttress area for traction purposes. The sidewall portions usually found in the tread slab can therefore be omitted. Conventional tread-compounds, including SBR and natural rubber, bond integrally with the Hytrel copolyester casing when they are applied to it in accordance with the present procedures.

In order to reduce plastic creep of the copolyester polymer during the life of the tire, as well as to reinforce the tread for wear-purposes, low-angle breakers or belts of fabric or steel may also be used, if desired. Such breakers should be applied to the casing after it has been coated with the bond-promoting material, so that the rubber impregnated breaker will chemically and mechanically adhere to it during curing of the tread assembly. The tread material is placed over the breakers, again making sure that all air is removed from between the breakers, casing and tread before the tread is cured.

After the tread has been completely stitched, a coat of black outside spray compatible with the tread rubber is applied to the tread in order to prevent molding defects. This spray material may be a gasoline solution of synthetic rubber and carbon black, designed to aid in bleeding out the air and in preventing mold flow defects in the cured tire.

The tire thus constituted with the uncured tread applied is then placed in the bottom half of a so-called clamshell type mold, that has been preheated to 300°F. After the top half of the mold is closed and locked, air is pumped into a bladder inside the tire to a pressure of 100 psi. thereby forcing the tire against the mold. The temperature and internal pressure of the mold are maintained until the tread rubber is cured (approximately 30 minutes). It is important, however, to prevent overheating of the tire casing when the tread is cured in the tread mold. The tread gauge should therefore not be excessive and the curing temperature and time should be selected so that there is no out of roundness of the tire caused by distortion of the plastic casing during curing of the tread.

Figure 4:
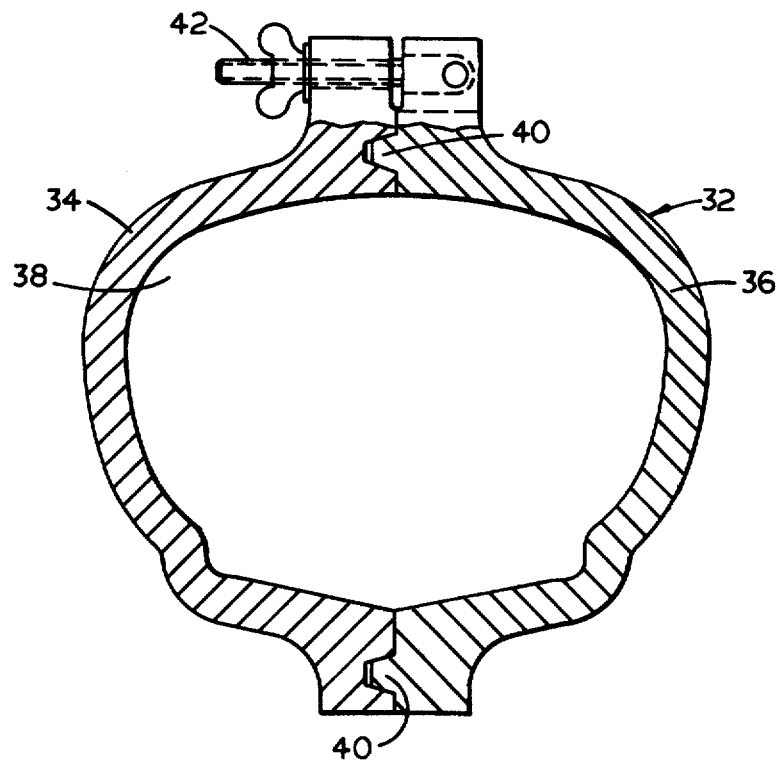
FIG. 4 is a suitable cavity profile and mold section of a rotational mold for molding the casing instead of using the compression mold illustrated in FIG. 2, it being understood that the mold is torus shaped, the section shown being taken on a radial plane through only one side of the mold.

It will also be appreciated that tire casings in accordance with the present invention may be molded in a rotational mold, such as that illustrated in FIG. 4. The mold 32 consists of two half-shells 34 and 36 which form a cavity 38, each shell being annularly shaped (only one side of the torroidal mold is shown in the drawing). Suitable tapered sockets and guide pins 40 are provided at spaced intervals around both the inner and outer mating edges of the shells 34 and 36 for precisely disposing the shells relative to each other. Clamping bolts 42 are also provided around the circumference of the shell 36 for rigidly clamping it to the mating shell 34.

The powdered Hytrel polymer is placed in the mold 32, which is then simultaneously heated and rotated, such that the material flows uniformly throughout the entire surface of the mold cavity. When the material is evenly distributed, the temperature is lowered below the melting point while rotation is continued. The tire casing thus formed may be employed as a closed tubular tire, or if desired, the inner wall between the two beads, may be cut away to form a conventionally shaped casing. Tire casings made by this rotational molding technique are then prepared for application of the rubber tread as hereinbefore described in connection with welded casings.

What is claimed is:

1. A method of manufacturing pneumatic tires for vehicles comprising the steps of casting a tire casing from a segmented thermoplastic copolyester elastomer comprising recurring polymeric long-chain ester units derived from dicarboxylic acids and low molecular weight diols, said thermoplastic elastomer having a medium to high durometer range of hardness, a tensile strength of about 6000 psi at room temperature and a melting point in the vicinity of 400°F, applying a bonding agent containing non-volatile isocyanate to the tread area of said casing, cementing an uncured rubber tread stock of conventional tread-stock material to said tread area and then curing the tread stock in a mold while in place on said tire casing at a temperature and for a period of time such that distortion of said tire casing is avoided while simultaneously vulcanizing said tread stock and integrally bonding it to said thermoplastic tire casing.

2. The method of manufacturing pneumatic tires as defined in claim 1, wherein pressure is applied internally of said tire casing and tread stock when the tread is molded to that said tread stock takes the shape of the mold.

3. The method of manufacturing pneumatic tires as defined in claim 1, wherein said tire casing is formed by compression molding it in two parts and welding said parts together.

4. The method defined in claim 3, wherein each of said tire-casing parts is identical and forms a half-casing, the mating edge of which defines a plane through the centerline of the tire casing perpendicular to the axis thereof.

5. The method defined in claim 4, wherein said half-casings are welded by heating a narrow strip of the same material from which said casings are cast while simultaneously heating adjacent mating edge-portions of said half-casings progressively along their mating edges, and continuously applying the strip to such heated area.

6. The method defined in claim 1, wherein said tire casing is molded in one piece by rotational molding.

7. A pneumatic tire for vehicles comprising a tire casing formed essentially of a cast segmented thermoplastic copolyester elastomer including recurring polymeric long-chain ester units derived from dicarboxylic acids and low molecular weight diols, said thermoplastic elastomer having a medium to high durometer range of hardness, a tensile strength of about 6000 psi at room temperature and a melting point in the vicinity of 400°F, and a tread of conventional tread-rubber stock integrally bonded to said tire casing and cured on said tire casing with a bonding agent at the interface of said tread and casing that contains a non-volatile isocyanate.

8. A pneumatic tire as defined in claim 7, wherein said tire casing comprises two parts integrally joined to each other along a joint disposed in a plane through the center-line of said tire casing perpendicular to the axis thereof.

9. A pneumatic tire as defined in claim 8, wherein said parts of said tire casing are heat-welded together.

10. A pneumatic tire as defined in claim 9, wherein the mating edges of said parts form a V-groove between them which is filled with the same material from which said parts are cast and integrally united with said mating edges as heat is applied to weld them together.

11. A pneumatic tire as defined in claim 7, wherein said tire casing in a one-piece rotationally molded casting.

* * * * *